(No Model.) 3 Sheets—Sheet 1.

W. D. GRIMSHAW.
MACHINE FOR INSULATING ELECTRICAL CONDUCTORS.

No. 306,744. Patented Oct. 21, 1884.

WITNESSES.
Wm T. Gilbert
Frank G. Parker

INVENTOR.
Wm D. Grimshaw
by
Wm H. Dowse
Atty.

(No Model.) 3 Sheets—Sheet 2.
W. D. GRIMSHAW.
MACHINE FOR INSULATING ELECTRICAL CONDUCTORS.
No. 306,744. Patented Oct. 21, 1884.

WITNESSES.
Wm. T. Gilbert
Frank G. Parker

INVENTOR.
Wm. D. Grimshaw
by Wm. B. H. Dowse
Atty.

UNITED STATES PATENT OFFICE.

WILLIAM D. GRIMSHAW, OF NEW YORK, N. Y., ASSIGNOR TO THE GRIMSHAW INSULATED WIRE AND CABLE MANUFACTURING COMPANY, OF SAME PLACE.

MACHINE FOR INSULATING ELECTRICAL CONDUCTORS.

SPECIFICATION forming part of Letters Patent No. 306,744, dated October 21, 1884.

Application filed May 16, 1884. (No model.)

*To all whom it may concern:*

Be it known that I, WILLIAM D. GRIMSHAW, of the city, county, and State of New York, have invented a new and useful Improvement in Machines for Insulating Electrical Conductors, of which the following is a specification.

The object of my invention is to provide an apparatus by means of which the electrical conducting-wires may be wrapped with an insulating covering or coverings.

My invention consists in a combination of machinery, hereinafter more particularly described, by aid of which an electrical conducting-wire may be easily and effectually insulated.

Figure 1:
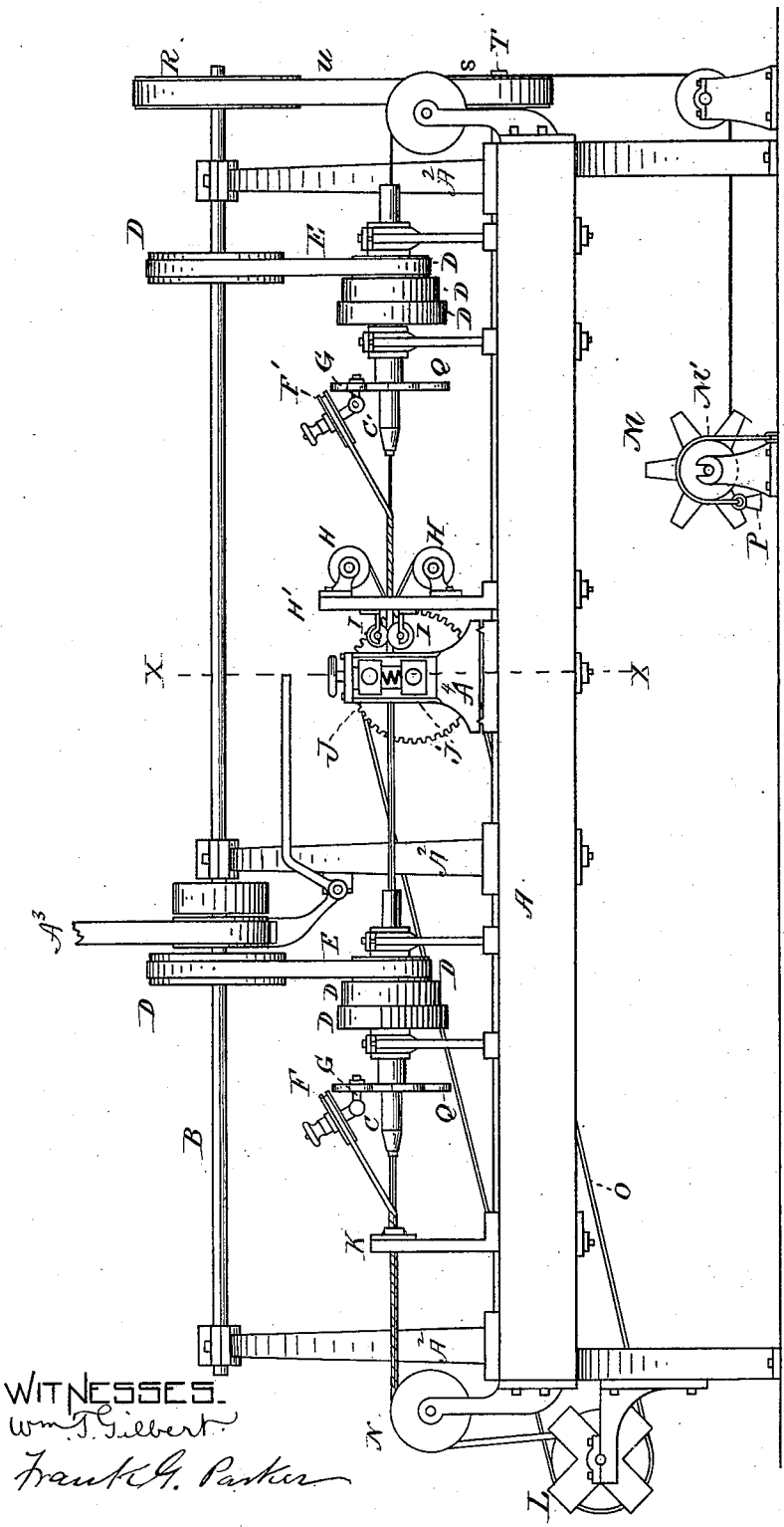
Figure 2:
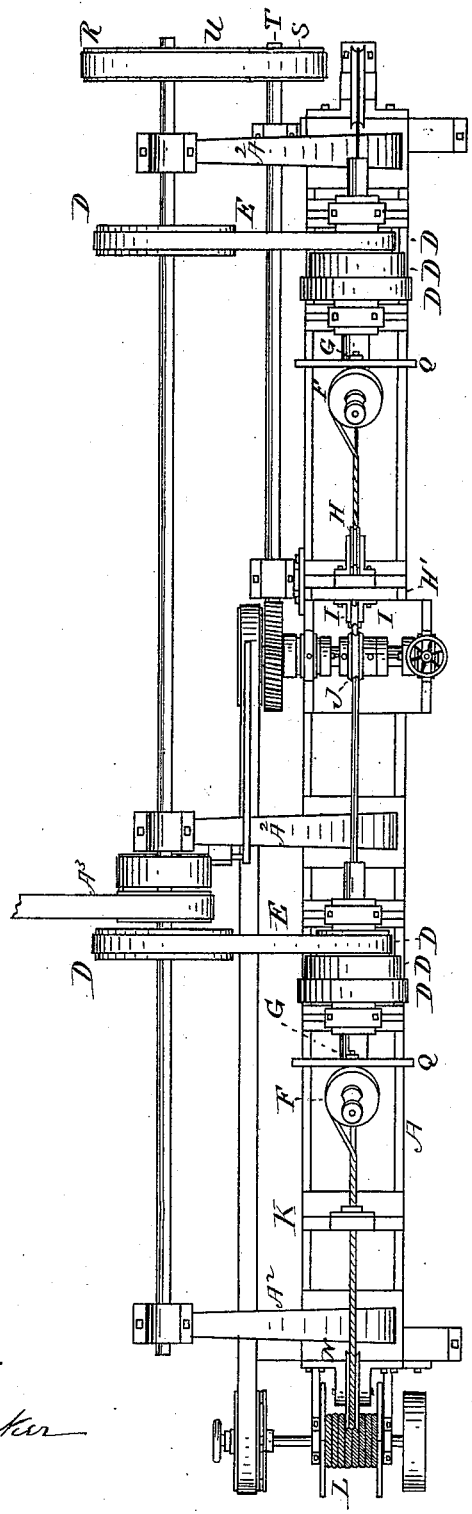
Figure 5:
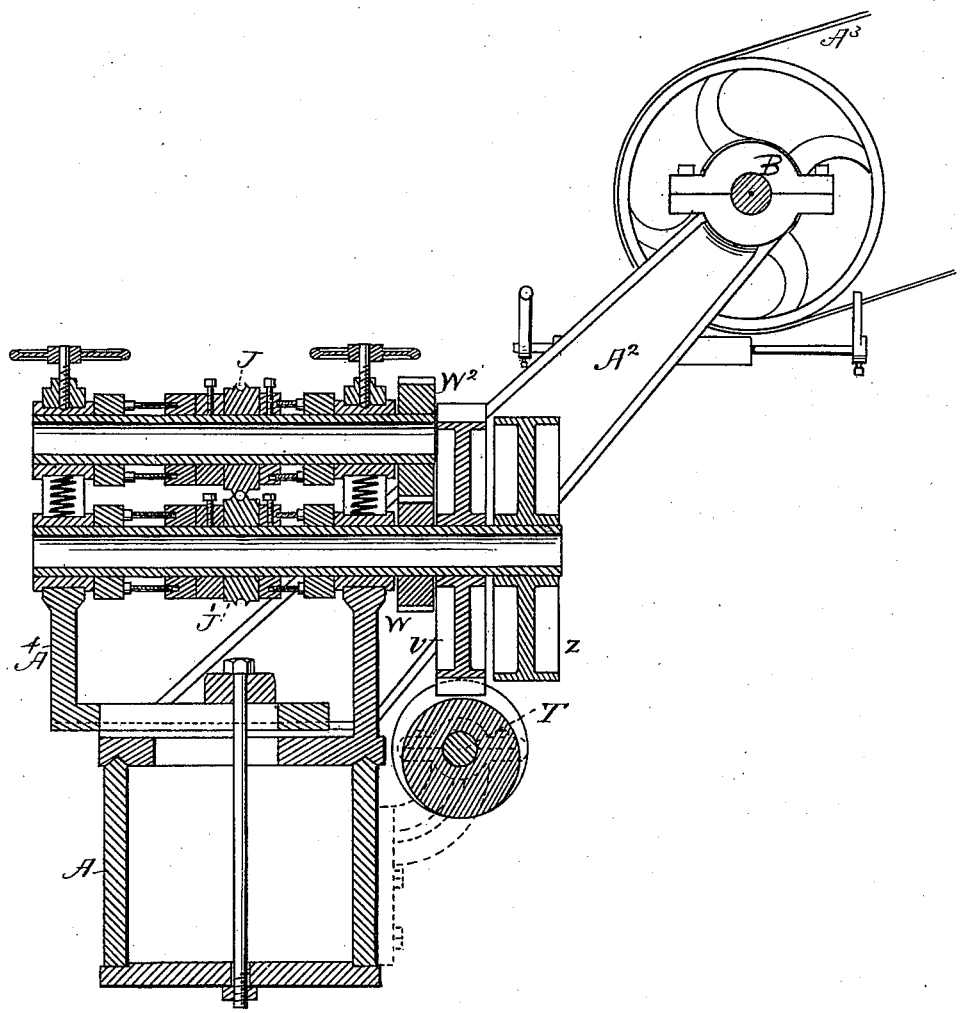

In the accompanying drawings, which illustrate my improved apparatus or machinery, similar letters indicating like parts, Figure 1 is an elevation of my improved machine. Fig. 2 is a plan view of the same, and Fig. 3 is an enlarged section on a line $x\ x$ of Fig. 1.

A is the frame of my improved machine.

B is a longitudinal driving-shaft rotating in suitable bearings above said frame; C C′, tubular shafts mounted in pedestals upon frames parallel with the driving-shaft B. These tubular shafts are placed in the same right line, so that their axes shall coincide, and each is geared to the shaft B by pulleys D D and a connecting-belt, E. Upon the tubular shafts C C′ circular plates (or radial arms) are fixed to rotate therewith in a vertical plane. Spools F F′ are arranged to rotate upon spindles pivoted upon arms projecting at opposite points from the face of each plate (or radial arm) G, so as to be revolved thereby around the tubular shaft C C′.

H H are bobbins mounted upon a suitable standard, H′, to rotate upon either side of the axis in front of the tubular shaft C C′ at a right angle to said axis.

I I are parallel grooved compressing-rollers mounted on the same standard, H′, to rotate in contact, so that the opening between the grooves in the line of the contact of the rollers shall coincide with the axis of the tubular shafts C C′.

J J′ are trimming-rollers mounted in line with the axis of the shaft O, to rotate in contact at right angles thereto in adjustable bearings supported in pedestals upon the frame A, and whose peripheries are concaved to form cutting-edges.

K is a forming roll or guide.

L is a take-up reel for the insulated conductor.

$A^2$ is one of the standards which support the shaft B, on which is a pulley around which the belt $A^3$ from the prime power passes. The pulley R is connected to the pulley S on the shaft T by a belt, U. The shaft T operates a worm-gear (shown in Fig. 3) on shaft T. This worm-gear pinions with a wheel, V, on the same shaft as gear-wheel W, which gears with wheel $W^2$. The cutters J J′ are on the shafts of W and $W^2$.

Z is the pulley on the shaft of cutter J′, which operates the belt O. The cutters J J′ are adjusted and held in place by collars and clamps, as shown in Fig. 3. The size of the cutters can be changed to conform to varying sizes of wire or thickness of insulation.

$A^4$ is a removable bed, which can be adjusted to move in and out to allow cutters of varying sizes to be used.

The operation of my machine and the manner in which I use it when I make the improved insulated conductor described in an application for Letters Patent of the United States therefor, sworn to of even date herewith, is as follows: The wire (preferably tinned) is led from the storage or supply reel M centrally through the tubular shaft C′ between the rollers I I. As it emerges from the end of the shaft C′, tape or a narrow strip cut from a sheet of any suitable compound wound upon the spool F is coiled around the wire, the convolutions overlapping each other at their edges so as to completely inclose it. Additional tapes or strips of any suitable compound are laid upon the wire longitudinally, on opposite sides thereof, from the bobbins H H, and the wire thus covered is passed between the rollers I I, by which the lapped tapes are compressed and made to adhere together thereon, so as to form a continuous homogeneous envelope, any excess thereof being removed by passing the concaved peripheries of the cutting-rollers J J. When thus uniformly coated with an inner and outer layer of any suitable compound, the wire is led through the second tubular shaft, C, and by means of the revolving spool F an outer protecting-covering of fibrous material or of metallic wire is wound thereon. After passing through the second compressing roll or guide K, the wire is finally led over the idle-pulley N to a take-up reel L, where it is coiled automatically with perfect regularity and evenness upon the reel without any overlapping of the strands. The wire is drawn automatically forward by means of the tension thereon of the rotating drum or reel L, which is driven by means of belt O from a pulley on the shaft of one of the cutting or trimming rollers J, so as to rotate in unison therewith. The belt O is led over the pulley of a friction-clutch on the shaft of the reel L, which operates to allow an independent movement of the belt and driving-pulley in case of any undue tension upon the reel. A brake, M', governed by a weight, P, is also applied to the supply-wheel M to control its rotation. Motion is imparted to the tubular shafts which carry the covering-spools by means of a belt or band, E, carried from a pulley, D, on the driving-shaft B to one of a series of single pulleys on the tubular shaft. By shifting said belt E from one to the other of this said series of single pulleys the speed of revolution of the covering-spools is regulated at will, so as to secure a uniform thickness of insulating material on the wire. As the movement of the drum or reel L which draws the coated wire away from the covering apparatus is obtained mediately from the driving-shaft B, the speed of the wire in respect to the covering apparatus is completely controlled, and may be varied at pleasure by shifting the belt from one to another of this said series of single pulleys on the tubular shaft. A series of single pulleys on the tubular shaft gives me a positive motion, and is a great improvement on a cone-pulley, or reverse cone-pulleys, which have been sometimes used to communicate motion. Ordinarily I use but one spool or reel, F'. I can, however, put on two or more reels, and thus wind on several tapes overlapping each other. The disk Q, to which the arm G, which carries the reel F', is attached, is divided into six parts, each part having a slot in it for the convenience of moving the arm or stud G, which carries the small reel whereon the tape or covering is wound. In each one of these slots can be placed an arm G, carrying a reel. It will thus be seen that I can easily place six tapes upon the wire, if desired, at these points. It is of great importance to entirely exclude all air from between the insulation and the electrical conductor. This is effectually accomplished by placing the insulation on the wire longitudinally from the reels H H, and then passing the wire through the impression-rollers I I.

In manufacturing an electrical conductor—covered, first, with a neutral wall; second, with an outer insulating material, and, third, with an outer external covering—such as I have described and claimed in an application subscribed and sworn to by me on the 28th day of March, A. D. 1884, the neutral wall is represented by the tape from the reel F', the outer or external insulation by the tapes from the reels H H, and the outer external covering or insulation by the tape from the reel F.

One of the special advantages of this machine over all others is that I am enabled to put on several distinct insulations at one operation.

I am fully aware that machines for insulating electrical conductors have been made before my invention described herein, and that machines have been made consisting of a series of shafts, pulleys, and reels. I therefore do not intend to broadly claim a machine consisting of these elements as new and as my invention; but What I do claim as new and as my invention is—

1. In a machine for winding wire with insulation, the tubular shaft C', the disk Q, provided with slots for radial arms or studs G, to which are pivoted spindles carrying covering-spools, and the series of pulleys D D D, substantially as set forth.

2. In a machine for winding wire for insulation, the reels H H and pressure-rolls I I, in combination with the cutters J J, adjusted on revolving shafts by collars and clamps, all arranged substantially as and for the purpose set forth.

3. In a machine for winding wire with insulation, the cutters J J, adjusted on revolving shafts by collars and clamps, in combination with the adjustable bed A⁴, substantially as and for the purpose shown and described.

4. In a machine for winding wire with insulation, the shaft T, provided with a worm-gear, in combination with the gear-wheels V, W, and W², all positively connected to their respective shafts, and the cutters J J, all arranged as and for the purpose set forth.

5. In a machine for winding wire with insulation, consisting of a power-shaft, B, provided with pulleys, the shaft T, provided with pulleys and gear, the tubular shafts C C, provided with pulleys, and a revolving disk having slots for arms or studs for pivoted feeding-spools, the feeding-reels H H, compressing-rollers I I, the cutters J J, adjusted and revolving shafts, as described, together with supply and take-up reels, all arranged and operated substantially as shown and described.

In witness whereof I have hereunto set my hand.

W. D. GRIMSHAW.

Witnesses:
WM. B. H. DOWSE,
WM. T. GILBERT.